United States Patent
Hakak

(10) Patent No.: US 7,200,341 B2
(45) Date of Patent: Apr. 3, 2007

(54) TECHNIQUE FOR LIVE INSERTION OF TRANSCEIVER MODULES IN A TELECOMMUNICATION SYSTEM

(75) Inventor: Israel Hakak, Petach Tikva (IL)

(73) Assignee: ECI Telecom Ltd, Petach Tikva (IL)

( * ) Notice: Subject to any disclaimer, the term of this patent is extended or adjusted under 35 U.S.C. 154(b) by 1010 days.

(21) Appl. No.: 10/217,032

(22) Filed: Aug. 13, 2002

(65) Prior Publication Data

US 2003/0048505 A1   Mar. 13, 2003

(30) Foreign Application Priority Data

Aug. 21, 2001   (IL) .................................... 145007

(51) Int. Cl.
*H04B 10/00* (2006.01)

(52) U.S. Cl. ..................................... 398/171
(58) Field of Classification Search ............. 372/38.04; 398/171
See application file for complete search history.

(56) References Cited

U.S. PATENT DOCUMENTS

| | | | |
|---|---|---|---|
| 5,272,584 A | 12/1993 | Austruy et al. | |
| 5,317,697 A | 5/1994 | Husak et al. | |
| 5,371,743 A | 12/1994 | DeYesso et al. | |
| 5,530,302 A | 6/1996 | Hamre et al. | |
| 5,862,350 A | 1/1999 | Coulson | |
| 6,925,516 B2 * | 8/2005 | Struhsaker et al. | ......... 710/301 |

OTHER PUBLICATIONS

LTC 1422; Linear Technology; Hot Swap Controller; pp. 1-16. (CA Apr. 1998).

* cited by examiner

*Primary Examiner*—David C. Payne
(74) *Attorney, Agent, or Firm*—The Nath Law Group; Harold L. Novick

(57) ABSTRACT

A smooth connector circuit for on-line connection of an optical telecommunication module to a main telecommunication unit, where the main unit comprises a common power supply circuit and is connectable to a number of optical telecommunication modules by separately creating with each of them a power connection, a control connection and a communication connection. When inserting an optical module to the main unit, the proposed smooth connector circuit is capable of successively creating the mentioned connections between the optical module and the main unit, so that the power connection is created first and established gradually.

11 Claims, 2 Drawing Sheets

TECHNIQUE FOR LIVE INSERTION OF TRANSCEIVER MODULES IN A TELECOMMUNICATION SYSTEM

FIELD OF THE INVENTION

The present invention relates to the field of telecommunication equipment, more particularly to such telecommunication systems which comprise a number of transmitting/receiving modules connectable to a central unit dealing both with data traffic and the modules control.

BACKGROUND OF THE INVENTION

A telecommunication system which will be discussed in the present patent application is a system comprising a number of telecommunication modules responsible, say, for a plurality of telecommunication channels and connectable to a main unit which supplies the modules with power, deals with data traffic from/to the modules and performs control of the modules. A MUX-DMUX block may serve an example of such a main unit interconnected with a number of telecommunication modules serving respective optical channels.

One of the problems, known to specialists in the field for such systems, stems from sharp fluctuations of voltage/current when trying to insert a module to the system, especially when the modules consume currents relatively greater than the current consumed in the main block. Since the power fluctuations may lead to damages both in the main unit and in the modules and, of course, to errors and numerous alarms in the data traffic, the modules are normally exchanged off-line. The off-line operations usually require shut-down of a card carrying the main unit for a period of time while a trained technician performs any desired changes in the system's configuration.

As has been mentioned, the changing power supply voltage may damage the modules. For example, when connecting a module to the main card, the power voltage applied to a particular element at its power contact grows slowly and, at the beginning of the connection process occurs to be lower than a control signal if already applied to the element's control gate. For preventing damage of such elements of the module, the following known solution is widely used. The modules to be interconnected with the main card are usually provided with longer pins of the power supply contacts so that, in the process of installing, they are brought into contact with the main unit power supply earlier than any other contacts of the module get into connection with their respective matches. Thus, when the module is completely connected to the main unit, the power supply voltage in the module might already be stable.

U.S. Pat. No. 5,371,743 describes the above "long pins" solution and a method of providing on-line replacement of a module which is at a specified position in an array of modules connected to a common control processor via a common voltage bus. When the module is removed, an indication is provided to the control processor showing that a removal has occurred and identifying the position thereof. When the replacement has occurred, an indication thereof is provided to the control processor. The US patent describes a system where the modules communicate with the control processor via common interface buses; the processor in such case enables that the modules are never connected to it together and therefore no module, during a transition process which may occur between it and the central processor, affects traffic in adjacent modules. The system described in the U.S. patent cannot be used for optical equipment.

U.S. Pat. No. 5,862,350 describes a similar "long pins" solution, but for asserting a busy line of SCSI bus being connectable to a number of devices. More particularly, it is a mechanism and a method for quiescing a SCSI bus by asserting the busy signal just prior to the SCSI signal pins making contact or decoupling during a hot modification. A hot modification is an insertion, removal or exchange of a device coupled to a SCSI interface bus while the system is operating (e.g., not powered down). By asserting the busy line for a predetermined and short period of time during the disturbance of the SCSI signal pins, glitches or noise introduced by the coupling or decoupling of the signal lines is isolated and prevented from causing transmission errors over the SCSI bus. According to the system described, any communication over the SCSI bus made just prior to the hot modification is allowed to complete before the signal pins are interrupted. For hot insertions, the system utilizes longer pins on the connector to assert the busy line just before coupling of the other pins of the connector. For removal, a special pair of short pins are placed on the connector to assert busy when decoupled. In either case, the busy line is then maintained as asserted for a predetermined period of time after the initial assertion to allow for communication over the SCSI bus to terminate before the hot modification.

None of the prior art references gives a simple practical solution for hot insertion of multiple modules in optical telecommunication networks.

At present, no live insertion of optical communication modules is ensured in the known equipment of telecommunication networks, and all repairs or reconfiguring operations are provided off-line.

OBJECT OF THE INVENTION

It is therefore the object of the present invention to ensure on-line connection of a module comprising one or more optical transceivers of respective communication channels to a common main unit in an optical telecommunication system, in such a way that this live insertion does not disturb the power supply and data traffic between the common main unit and any of the modules coupled to it.

SUMMARY OF THE INVENTION

Due to the very nature of the high rate optical technology, a huge number of information channels can be transmitted and processed at network elements of modern optical telecommunication systems. This fact explains the rapidly growing demand for modularity in such systems, which, due to the great number of modules to be interconnected, comes into conflict with the idea of using common interfaces or buses. On the other hand, the idea of hot insertion of optical communication modules, without disturbing traffic therethrough, remains highly actual.

It has been realized by the Inventor that errors introduced in the telecommunication data transmission due to the transition processes caused by connecting modules to the main unit can be eliminated if sharp changes in the power supply voltage of the main unit and consequent sudden current consumption in the modules are prevented.

Likewise, it has been kept in mind that if the common voltage bus is eliminated and separate power supply circuits are used in the modules, the system appears to be counterproductive from the point of overhead.

To prevent power fluctuations which are harmful to the modules and the traffic quality, and enable flexible reconfiguring of optical network equipment having a great number of optical modules, the following solution is proposed.

There is provided a smooth connector circuit for on-line connection of an optical telecommunication module (a module card) to a main telecommunication unit (main card) comprising a common power supply circuit and connectable to a number of optical telecommunication modules by separately creating with each of them a power connection, a control connection and a communication connection, the smooth connector circuit, whenever an optical telecommunication module is connected to the main unit, being capable of successively creating said connections between the optical communication module and the main unit, so that the power connection is created first and a required level of power supply in said module is reached gradually.

Preferably, the smooth connector circuit comprises at least one electronic switching circuit forming part of the power supply circuit of said main unit and capable of gradually rising the power supply voltage at the telecommunication module up to at least one respective required value, whenever said module is physically connected to the main unit. (Sometimes, several levels of power supply are required for one and the same telecommunication module). The electronic switching circuit is activated when the physical state of connection of the module with the main unit is changed; contrary to the function of long pins which just performs early switching of the power supply, the proposed smooth connector circuit ensures gradual growing of the power supply voltage in the module when inserted.

Under the control connection one should understand a connection enabling the main unit to recognize the telecommunication module connected to it, to read parameters of said module and to enable start of communication between the main unit and said module.

The communication connection should be understood as a connection ensuring data exchange between the main unit and said module.

Preferably, the arrangement of the smooth connector is such that only when the power supply at the module reaches the required value, the module card becomes accessible to the main card for starting any control actions and initiating transmission between transceiver(s) of the module and a traffic responsible block (say, ASIC) in the main card.

To this end, the smooth connector circuit preferably comprises a delay circuit for creating the control and communication connections between the telecommunication module and the main unit after the power connection is established and the power supply voltage at said module reaches said at least one required value.

The smooth connector circuit may, for example, comprise the electronic switching circuit similar to an integrated printed device LTC1422 (so-called Hot Swap controller manufactured by Linear Technology LTD).

According to the preferred embodiment of the invention, the electronic switching circuit of any particular module is positioned at the main unit, thereby simplifying structure of the modules, eliminating the number of connections between the main unit and the modules and providing in the main unit an array of such multiple circuits intended for the easy connection of the numerous modules.

For performing any traffic function only when the transition processes caused by the voltage fluctuations are terminated, the delay means may comprise a Schmit trigger assembly which is operative to enable interaction between the main unit and the module when the power supply voltage of the module reaches its at least one required value.

The delay means is actually responsible of creating a feedback for the main unit which will therefore start exchanging control and data messages with the module only when all transition processes are over. It means that when starting data transmission between the main unit and the module, no errors in the data traffic carried via the module can be caused by the fact of its recent connection. The delay means is preferably located in the corresponding module, but in any case is designed to start interaction with the main unit upon some time after stabilizing the local power supply.

According to another aspect of the invention, there is provided an optical telecommunication module comprising one or more optical transceivers and suitable for live insertion into a telecommunication network via a main unit comprising a common power supply circuit, the live insertion being performed by means of a smooth connector circuit successively creating between the module and the main unit, whenever physically coupled, a power connection, a control connection and a communication connection, wherein a required level of power supply in the module is reached gradually.

The smooth connector circuit may be located at the module and comprise at least one electronic switching circuit forming part of the power supply circuit of said main unit and capable of gradually rising the power supply voltage at the telecommunication module up to at least one respective required value whenever said module is physically connected to the main unit, thereby gradually establishing the power connection.

Also, the module preferably comprises a delay circuit forming part of the smooth connector circuit and ensuring successive establishing of the control and communication connection with the main unit upon stabilizing of the power supply in the module.

The telecommunication module (module card) may comprise more than one optical transceivers of respective communication channels for creating a multi-channel said communication connection with the main unit (main card).

The optical transceiver is preferably suitable for transmitting and receiving a data stream accepted in one or more optical telecommunication hierarchies. In a particular embodiment, the optical transceiver may be suitable for transmitting/receiving a data stream of SONET or SDH (for example, data streams STM-1, STM-4, etc.), GBEthernet, ATM and others.

The optical telecommunication module preferably comprises a memory and an A/D converting block connected to the one or more optical transceivers, said memory and said A/D block being adapted for establishing the control connection with the main unit.

Similarly, there is further provided a so-called main unit of a telecommunication equipment, comprising a common power supply circuit and enabling live insertion to it of a number of optical telecommunication modules by forming with each of them separate connections, the live insertion being performed by means of a smooth connector circuit successively creating between any of said modules and the main unit, whenever physically coupled, a power connection, a control connection and a communication connection, wherein said power connection is gradually established (i.e., a required level of the power supply in the module is reached gradually).

The main unit of the system preferably comprises at least as many of the electronic switching circuits, as the number of the telecommunication modules connectable to the main unit. If any of the modules use more than one power supply voltage values, the number of the hot-swap circuits in the main unit may be more than the number of said modules connectable to it.

The main unit should be a combination of optical and electrical elements for performing said power, control and telecommunication connections. For example, the main unit comprises a control unit operative to recognize the modules connected to it and to read various parameters of the module using the control connection. Also the main unit comprises an executive block such as ASIC for manipulating incoming and outgoing data streams using the telecommunication connection.

According to yet a further aspect of the invention, there is provided a telecommunication system comprising a number of telecommunication modules and a main unit connectable to said modules by separately creating with each of them power, control and communication connections, the proposed system comprising at least one smooth connector circuit as described above.

Owing to the proposed smooth connector arrangement, the system acquires the properties of modularity and flexibility i.e., allows simple and harmless replacement of the optical telecommunication modules and the system reconfiguring to be made even by a non-trained operator.

Indeed, the electronic switching circuits serve separate telecommunication modules by connecting the power supply circuit of the main unit to any particular one of the different modules and thus make the power circuits of the modules separate. Therefore, voltage fluctuations caused by the connection of a particular module to the main unit cannot affect other modules connected to the main unit. The delay means of each of the modules ensures starting the traffic activity between a module and the main unit after the complete power stabilization upon insertion of the module.

Finally, an additional aspect of the invention is a kit of the telecommunication equipment including at least one main unit and at least one telecommunication module described above.

BRIEF DESCRIPTION OF THE DRAWINGS

The invention can be further described with the aid of the following non-limiting drawings in which.

DETAILED DESCRIPTION OF THE PREFERRED EMBODIMENTS

Figure 1:
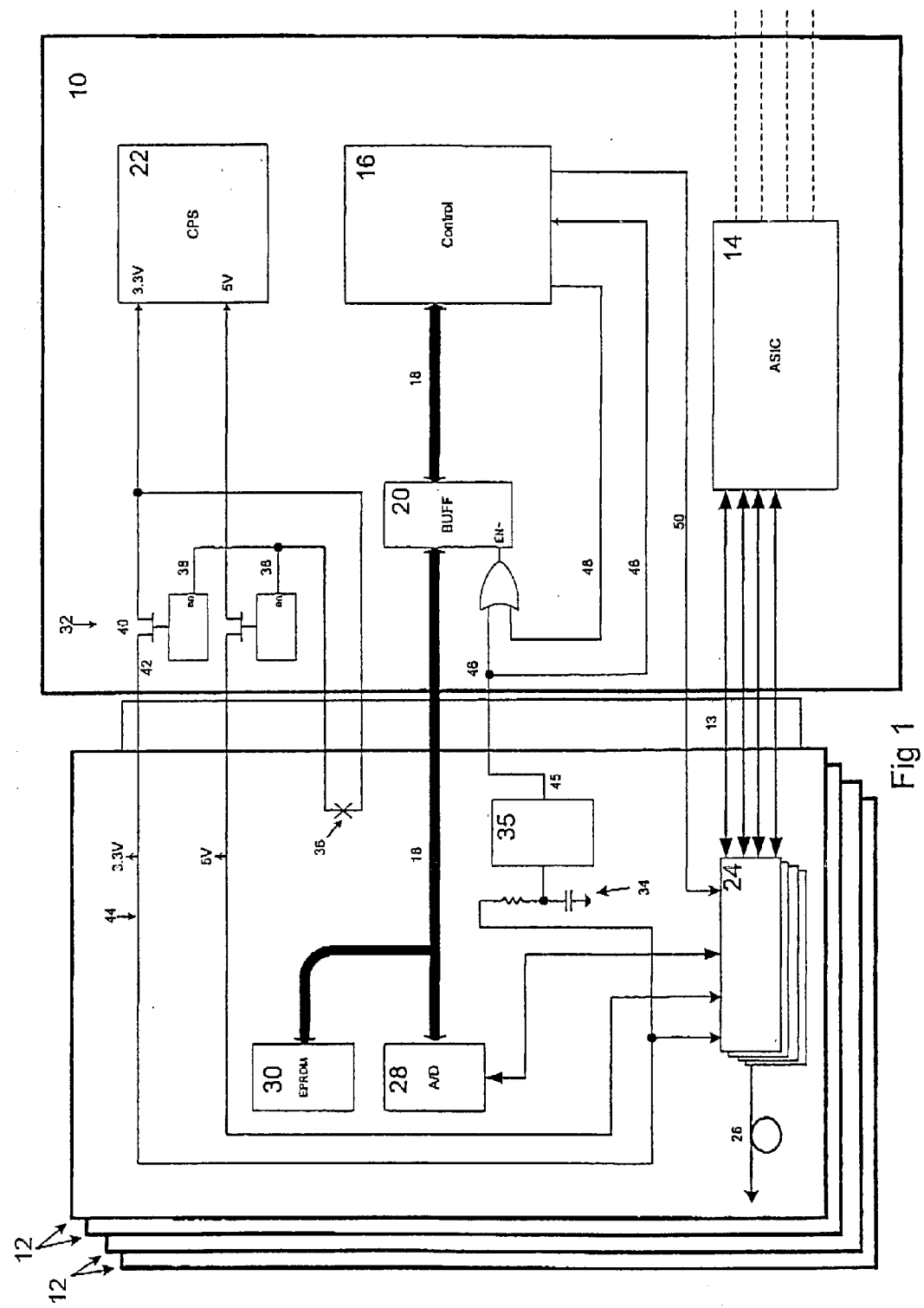
FIG. 1 is a pictorial diagram schematically illustrating the manner of interconnecting a number of telecommunication modules with the main unit via a so-called smooth connector arrangement according to the invention.

FIG. 1 shows a schematic diagram where the main telecommunication unit (marked 10) is interconnected with optical modules 12. Let the main unit 10 is responsible for cross-connecting of optical channels in a multi-channel optical network, wherein data transmission in each of the channels is handled by a particular optical module 12. Other examples of the main unit functionality may be an SDH/SONET interface, optical interface, combination of such an interface with the cross-connecting, etc. Let the cross-connection operation in the main unit is performed by means of its executive block 14 (marked as ASIC) connected to the optical modules 12 by separate transmission lines 13, wherein each optical transmitter (24) has its transmission channel; the control in the main unit is provided by a control block 16 connected to each of the optical modules 12 via a corresponding control bus 18. In this drawing, the "upper" module 12 is particularly shown, interconnected with the main unit 10 via a number of transmission lines (channels) 13 and its control bus 18 provided with a buffer-driver 20.

Also, a central power supply (CPS) 22 of the main unit 10 is intended for feeding each of the optical modules 12 with the VCC voltage(s) required at the module. Typically, the required VCC voltage is 3.3 V, but optionally the voltage of 5.5 V can also be provided to the modules.

As mentioned, each of the optical modules 12 comprises one or more optical transceivers 24 adapted to be in communication with the executive block 14 of the main unit, each transceiver using its optical channel. These transceivers may create, for example, data streams of the SDH/SONET hierarchy, such as STM-1, STM-4, etc. In this particular example, the transceivers 24 communicate with the executive block 14 of the main unit by electrical data streams, while utilizing optical signals during transmission over an optical fiber 26. The standard optical transceivers usually require the VCC voltage of 3.3 V. The optical transceivers are interconnected with an analog-to-digital (A/D) converter block 28 of the particular module. The converter block 28 is operative to read analog parameters from the transceivers 24 (say, the receiving power, the transmitting power, the bias current for determining the remaining life time of a particular laser transmitter, etc. The A/D 28, in turn, is connected to the control bus 18 and is capable of transmitting the collected information on the module via the bus to the control block 16. An EPROM (memory) block 30 of the module is also connected to the same bus 18. The memory block is responsible of storing data on the particular module 12, such as its ID code and other parameters which are necessary for identifying the module by the control block 16 of the main unit 10, look-up tables for translating the analog information collected by the block 28 into digital information suitable for transmitting it via the bus 18.

To provide safe and simple on-line insertion of any of the optical modules, the following arrangement is provided in the configuration. In this drawing, a so-called smooth connector circuit comprises at least one hot-swap circuit 32 in the main unit, for safe switching the power supply voltage in the module, and a delay circuit 34 in the optical module, for starting the control information exchange and the transmission only after the voltage in the module has reached its normal level. The delay circuit, for example, comprises a Schmit trigger 35 which issues an output signal only when the input signal reaches a predetermined threshold. For example, the Schmit trigger 35 may be adjusted to the voltage of 3.3 V.

The hot-swap circuit 32 is activated when parts of a contact 36 between the module 12 and the main card 10 have been physically locked. The closed contact 36 causes appearance of an enabling signal 38 on at least one hot-swap circuit supported by the central power supply 22, upon which the hot-swap circuit issues a gradually growing signal on the gate of its associated transistor 40 and, consequently, on a controllable electrode 42 of the transistor 40. The signal on the controllable electrode 42 gradually reaching the required voltage predetermined by the CPS 22, can be used as a power supply signal on a power bus (marked 44) of the telecommunication module 12, thereby establishing the so-called power connection between the main unit and the module. For example, the power supply voltage 3.3V may feed the optical transceivers 24 in the module 12. However, to enable identification of the module by the control unit 16 and to start transmission via the transceivers 24, the gradually growing signal of the power supply bus 44 is fed to the delay circuit 34. Since the Schmit trigger 35 reacts only to the complete signal 3.3 V, the inserted module will be detected by the control unit 16 whenever a signal appears on the trigger contact 45. The signal 46 of the detected module is sent to the control unit 16 where it causes appearance of a buffer enable signal 48 which, together with the module detection signal 46 activates the buffer 20. The active buffer 20 enables the control information exchange between the module and the main card via the bus 18, i.e., enables the so-called control connection. Upon termination of the control information exchange, the control unit 16, by an enabling signal 50, allows operation of the optical transceivers 24 via the optical line 26 and the electrical lines 13, thereby establishing the so-called communication connection.

Removal of the module from the main unit (card) causes break of the contact 36 and immediate sharp decrease of the power supply voltage applied to the circuit 35. In case the input voltage of the Schmit trigger 35 is lower than the predetermined threshold, it immediately alters the signal 46 which will be understood by the buffer 20 and the control unit 16 as disconnection of the particular module. The control unit will change the signal 50 to disable the transmission via the optical transceivers 24.

Figure 2A:
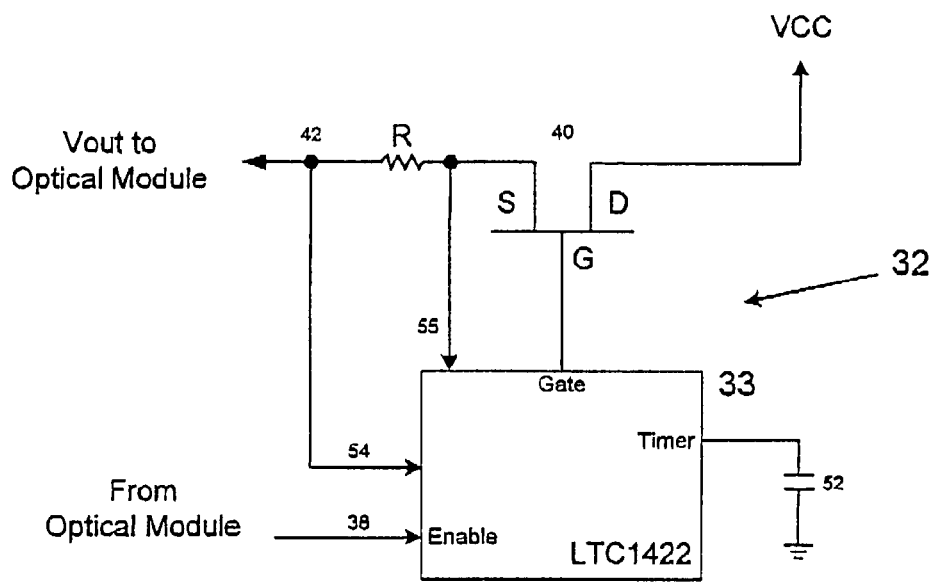
FIGS. 2a, 2b is a schematic block-diagram illustrating the hot-swap circuit of the safe connector in more detail, and a time diagram of its operation.
Figure 2B:
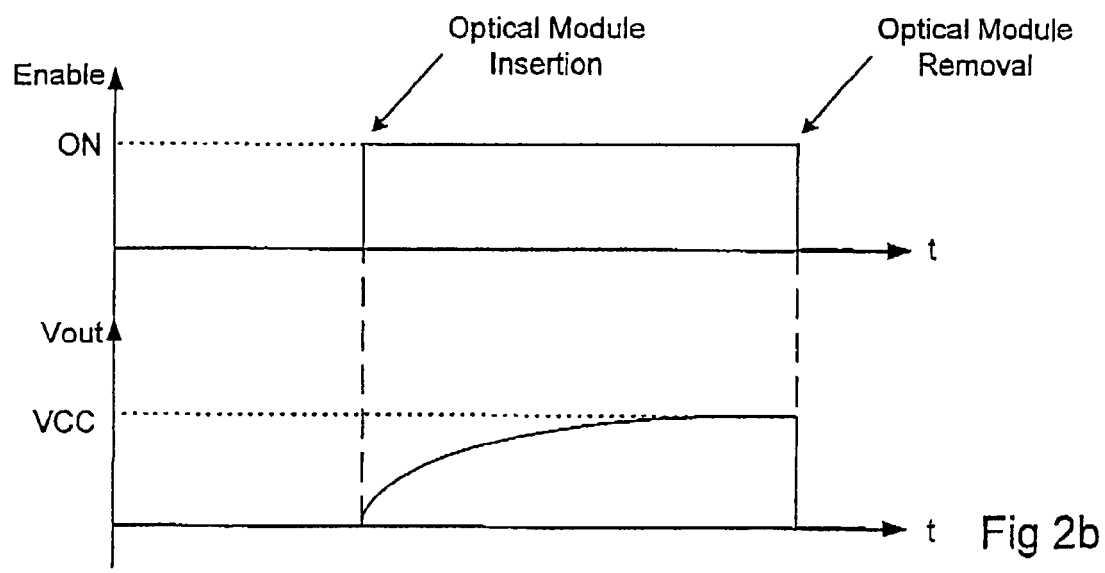

FIG. 2a shows the electronic switching circuit implemented using the hot-swap controller LTC1422 of Linear Technology LTD. FIG. 2b presents a time diagram of the output signal of the hot-swap block in cases of the optical module insertion and removal.

In this embodiment, the switching circuit 32 comprises a controller 33 LTC1422 associated with an external n-type transistor 40 also shown in FIG. 1. The enabling contact 38 of the controller 33 is connected to the contact socket (36) between a particular telecommunication module 12 and the main unit 10. The controller is equipped with a timer input implemented by a capacitor 52. The controller is additionally provided with feedback contacts 54 and 55 capable of monitoring the output voltage and current.

FIG. 2b illustrates, how a signal applied to the enable contact 38 of the hot-swap controller 32 is translated on the controlled electrode 42 of the transistor 40 i.e., shows the shape of the output voltage which is forwarded to the optical module. The time period during which the voltage reaches its VCC value can be regulated by the capacitor 52 and the transistor 40. When the optical module 12 is removed, contact 36 is broken and the enabling signal disappears from the contacts 38. It means that the power supply of the module 12 from the main unit 10 is cut immediately (the output voltage on contact 42 falls sharply).

Withdrawal of the module 12 results also in disappearance of signal 46 from the trigger contact 45. Due to that, control unit 16 stops detecting the presence of the particular optical module 12, and buffer 20 is no more activated since it does not receive the buffer enable signal 48. The inactive buffer breaks the communication bus 18 between the control unit 16 and blocks 28(A/D) and 30(memory). Owing to that the control unit is prevented from receiving any erroneous information from the blocks 28, 30 in the transition period and thus operation of the main unit is not disturbed. Disappearance of the signal 46 also causes the control unit 16 to turn signal 50 to the condition "transmission off".

In short, withdrawal of the optical module causes all components of the main unit to pass to the default state which they were in before the optical module was inserted. Should insertion of a new optical module be required, the main unit will be ready to provide it in the manner of smooth connection as described above.

It is to be understood that the above description serves only for demonstrating certain embodiments of the invention. Numerous other ways of carrying out the invention provided may be devised by a person skilled in the art without departing from the scope of the invention, and are thus encompassed by the present invention.

The invention claimed is:

1. A smooth connector circuit for on-line connection of an optical telecommunication module to a main telecommunication unit comprising a common power supply circuit and connectable to a number of optical telecommunication modules by separately creating with each of them a power connection, a control connection and a communication connection, the smooth connector circuit, whenever an optical telecommunication module is connected to the main unit, being capable of successively creating said connections between the optical communication module and the main unit, so that the power connection is created first and a required level of power supply in said module is reached gradually, the smooth connector circuit further comprising a delay circuit for creating the control and communication connections between the telecommunication module and the main unit after the power connection is established and the power supply level at said module is reached, wherein the delay circuit comprises a Schmit trigger assembly operative to enable interaction between the main unit and the module when the power supply level at the module reaches its required level.

2. The smooth connector circuit according to claim 1, comprising at least one electronic switching circuit forming part of the power supply circuit of said main unit and capable of gradually rising the power supply voltage at the telecommunication module up to at least one respective required value whenever said module is physically coupled to the main unit.

3. An optical telecommunication module comprising:

one or more optical transceivers and suitable for live insertion into a telecommunication network via a main unit comprising a common power supply circuit, the live insertion being performed by means of a smooth connector circuit successively creating between the module and the main unit, whenever physically coupled, a power connection, a control connection and a communication connection, wherein a required level of power supply in the module is reached gradually; and the module comprising a memory and an A/D converting block connected to the one or more optical transceivers, said memory and said A/D block being adapted to establish the control connection with the main unit.

4. The module according to claim 3, wherein the smooth connector circuit comprises at least one electronic switching circuit located on the module, forming part of the power supply circuit of said main unit and capable of gradually rising the power supply voltage at the telecommunication module up to at least one respective required value whenever said module is physically connected to the main unit.

5. The module according to claim 3, comprising a delay circuit forming part of the smooth connector circuit and ensuring successive establishing of the control and communication connections with the main unit upon stabilizing of the power supply in the module.

6. The module according to claim 3, comprising more than one optical transceivers of respective communication channels for creating a multi-channel said communication connection with the main unit.

7. The module according to claim 3, wherein said at least one optical transceiver is suitable for transmitting and receiving a data stream accepted in one or more optical telecommunication hierarchies.

8. A main unit of a telecommunication equipment, comprising:
   a common power supply circuit and enabling live insertion to it of a number of optical telecommunication modules by forming with each of them separate connections, the live insertion being performed by means of a smooth connector circuit successively creating between any of said modules and the main unit, whenever physically coupled, a power connection, a control connection and a communication connection, wherein a required level of power supply in said module is reached gradually; and
   the main unit comprising a control unit operative to recognize the modules connected to it and parameters of said modules using the control connection, and an executive block for manipulating incoming and outgoing data streams using the telecommunication connection.

9. A main unit of a telecommunication equipment comprising:
   a common power supply circuit and enabling live insertion to it of a number of optical telecommunication modules by forming with each of them separate connections, the live insertion being performed by means of a smooth connector circuit successively creating between any of said modules and the main unit, whenever physically coupled, a power connection, a control connection and a communication connection, wherein a required level of power supply in said module is reached gradually, and wherein the smooth connector circuit comprises a number of electronic switching circuits forming part of the power supply circuit of the main unit, associated with said modules and positioned at the main unit, thereby forming in the main unit an array of the electronic switching circuits.

10. A telecommunication system comprising a number of telecommunication modules and a main unit connectable to said modules by separately creating with each of them power, control and communication connections, the system comprising:
   at least one smooth connector circuit according to claim 1, or
   at least one of said modules implemented according to claim 3, or
   said main unit in the system implemented according to claim 8, or
   said main unit in the system implemented according to claim 9.

11. A kit of telecommunication equipment comprising:
   at least one main unit according to claim 8, or
   at least one main unit according to claim 9, or
   at least one telecommunication module according to claim 3.

* * * * *